Dec. 30, 1958 L. H. BROWN Re. 24,583

AUTOMATIC FLOOR MOP

Original Filed Oct. 15, 1954 2 Sheets-Sheet 1

INVENTOR.
Lester H. Brown
BY Victor J. Evans & Co.
ATTORNEYS

AUTOMATIC FLOOR MOP

Original Filed Oct. 15, 1954 2 Sheets-Sheet 2

INVENTOR.

Lester H. Brown

BY Victor J. Evans & Co.

ATTORNEYS

United States Patent Office

Re. 24,583
Reissued Dec. 30, 1958

24,583

AUTOMATIC FLOOR MOP

Lester H. Brown, Indianapolis, Ind., assignor to S. C. Johnson & Son, Inc., a corporation of Wisconsin Original No. 2,774,089, dated December 18, 1956, Serial No. 462,554, October 15, 1954. Application for reissue June 13, 1957, Serial No. 666,497

8 Claims. (Cl. 15—98)

Matter enclosed in heavy brackets [ ] appears in the original patent but forms no part of this reissue specification; matter printed in italics indicates the additions made by reissue.

This invention relates to a cleaning implement, and more particularly to a mop for cleaning floors or the like. *The present application is for the reissue of United States Patent Number 2,774,089.*

The object of the invention is to provide a cleaning implement which can be used as an automatic floor mop, wax applicator, or floor polisher.

Another object of the invention is to provide an automatic cleaning implement which, when being used as a floor mop includes a container for holding fluid such as soapy water whereby the water passes down onto rotary cleaning elements and onto the floor to be cleaned, and then the fluid containing the dirt, lint and the like from the floor is automatically picked up and carried back into the machine and then this fluid is filtered so that the foreign matter is removed therefrom whereby the fluid which continually circulates through the machine is clean.

A further object of the invention is to provide an automatic floor mop which is extremely simple and inexpensive to manufacture.

Other objects and advantages will be apparent during the course of the following description.

In the accompanying drawings, forming a part of this application, and in which like numerals are used to designate like parts throughout the same:

Figure 1:
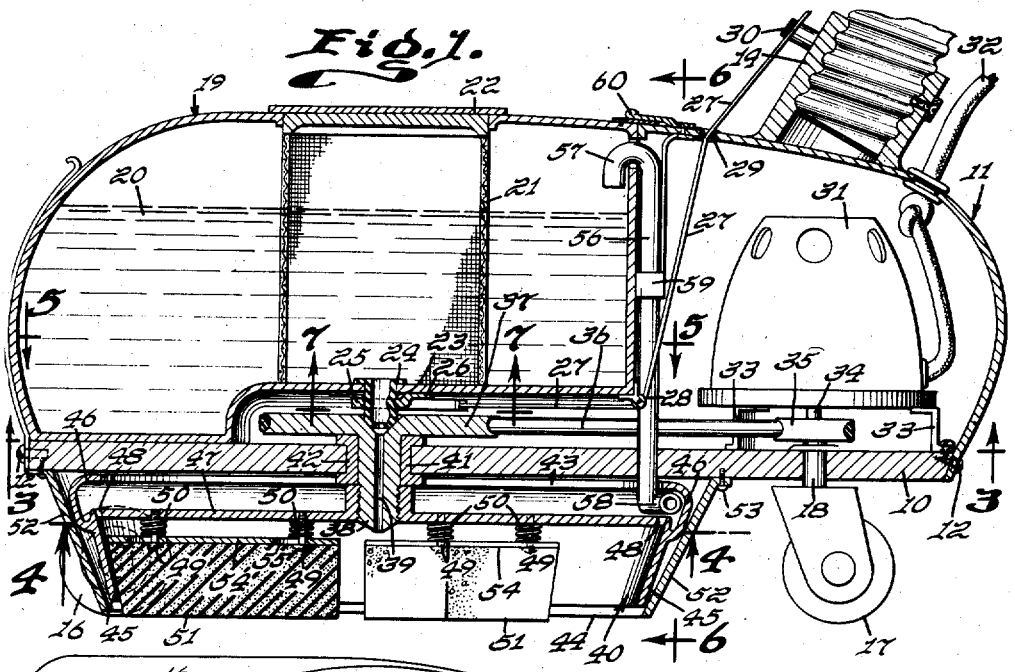
Figure 1 is a vertical longitudinal sectional view taken through the automatic floor mop.
Figure 2:
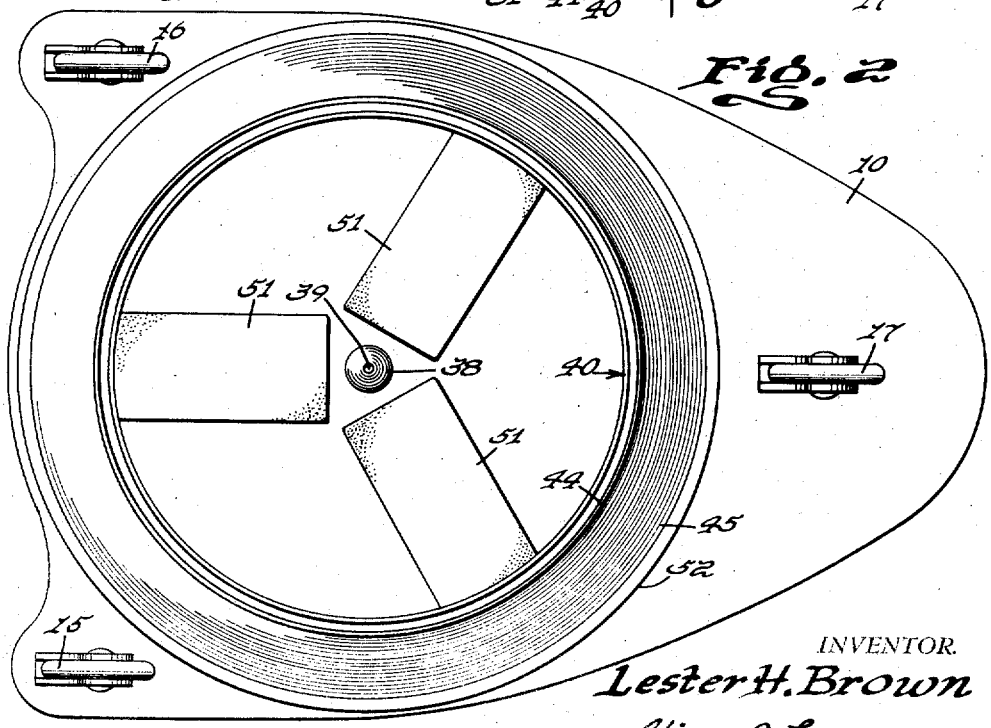
Figure 2 is a bottom plan view of the floor mop.
Figure 3:
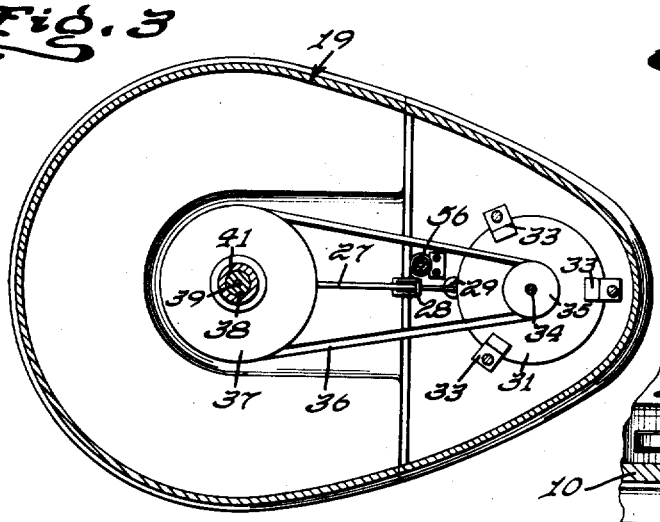
Figure 3 is a sectional view taken on the line 3—3 of Figure 1.
Figure 6:
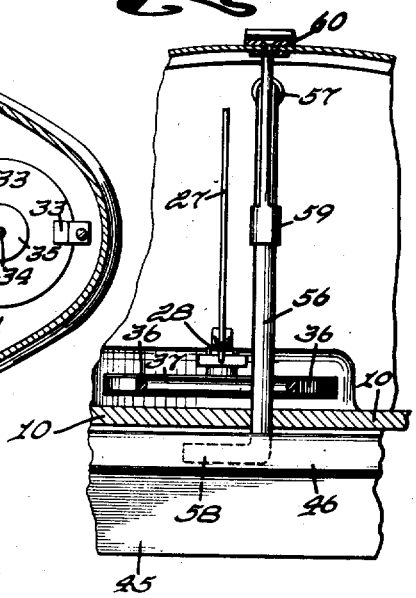
Figure 6 is a sectional view taken on the line 6—6 of Figure 1.

Referring in detail to the drawings, the numeral 10 designates a horizontally disposed base which can be made of any suitable material, and extending upwardly from the base 10 is a hollow housing 11, and the housing 11 may have its lower end connected to the base 10 in any suitable manner as for example by means of screws 12. A handle 14 projects upwardly from the housing 11 and is secured thereto so that the mop can be readily moved along the floor, Figure 1.

Depending from the base 10 and connected thereto is a plurality of castor wheels 15, 16 and 17. The wheel 17 may be swivelly connected to the base 10 by means of a stub shaft 18.

Positioned in the housing 11 and supported on the base 10 is a hollow container 19 which is adapted to hold a quantity of cleaning fluid such as soapy water 20. A cylindrical filter 21 which may be made of reticulated material, extends upwardly from the bottom of the container 19 to the top thereof, and a lid 22 is releasably supported above the filter 21. Thus, by removing the lid 22 the filter 21 can be removed so that it can be cleaned, or else by removing the lid 22 access can be gained to the interior of the container.

The bottom of the container 19 is provided with an opening 23 through which is adapted to pass the fluid 20, and a bushing 24 which is hollow and which is made of a suitable yieldable material such as rubber extends through the opening 23. The ends of the bushing 24 are open. A manually operable valve means is provided for controlling the flow of fluid through the rubber bushing 24, and this means comprises a movable bracket 25 which surrounds the bushing 24. The bracket 25 is adapted to be used for forcing the rubber bushing 24 against a stationary stop member 26, and the stop member 26 is secured to the bottom of the container 19. A suitable cable 27 may be connected to the bracket 25, and the cable 27 is trained over a guide member 28 and then the cable passes up through a grommet 29 in the housing 11. The cable 27 may also be further arranged in engagement with a guide member 30 which is mounted on the handle 14, and the cable can extend upward to a suitable manually operable lever on the top of the handle.

Extending upwardly from the base 10 and secured thereto is a plurality of support members 33 which serve as a support for a conventional electric motor 31 that is adapted to be connected to a suitable source of electrical energy by means of a wire or cable 32. A drive shaft 34 is operated by the motor 31, and a pulley 35 is mounted on the lower end of the shaft 34. An endless belt 36 is trained over the pulley 35, and the belt 36 is also trained over a pulley 37 which is on the upper end of a driven shaft 38. The driven shaft 38 is provided with a longitudinally extending vertically disposed bore or passageway 39 which is adapted to receive water from the bushing 24.

Figure 4:
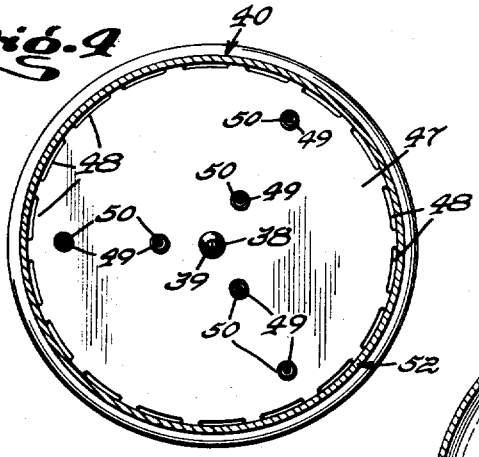
Figure 4 is a sectional view taken on the line 4—4 of Figure 1.
Figure 5:
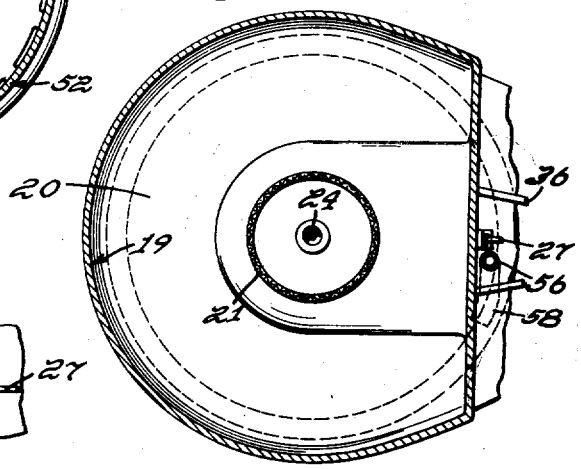
Figure 5 is a sectional view taken on the line 5—5 of Figure 1.
Figure 7:
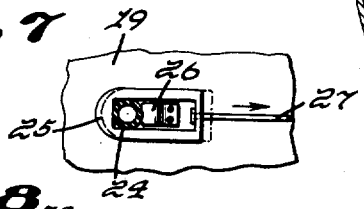
Figure 7 is a sectional view taken on the line 7—7 of Figure 1.

Rotatably positioned below the base 10 is a hollow drum 40. The shaft 38 is rotatably mounted in a bearing 41 which extends through an opening 42 in the base 10. The top of the rotary drum 40 is open as at 43, while the bottom is open as at 44 for a purpose to be later described. The drum 40 further includes a continuous side wall 45 which has a flaring shape so that the upper end of the side wall 45 is of greater diameter than the lower end. A horizontally disposed partition 47 is positioned in the drum 40, and the portion of the drum above the partition 47 is shaped to provide an enlarged cylindrical chamber 46. There is provided in the partition 47 adjacent its outer periphery a plurality of spaced apart cutouts or openings 48, Figure 4, and these openings are adapted to permit water or other fluid to pass upwardly into the chamber 46.

Figure 8:
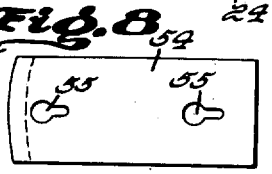
Figure 8 is a plan view of one of the mounting plates for the cleaning element.

Depending from the partition 47 is a plurality of pins or bolts 49, and arranged in engagement with the lower ends of these bolts are plates 54, Figure 8. The plates 54 are provided with slots 55 through which extend the bolts 49, and coil springs 50 are circumposed on each of the bolts 49, and the coil springs 50 are interposed between the partition 47 and the plates 54. Cleaning elements are secured to the plates 54 in any suitable manner, and the cleaning elements are indicated by the numeral 51. These cleaning elements may be in the nature of sponges or the like. Surrounding the rotary drum 40 is a stationary guard of frusto-conical shape, and the upper end of the guard 52 secured to the lower surface of the base 10 in any suitable manner, as for example by means of securing elements 53, The automatic mop of the present invention further includes a vertically disposed tube 56 which has its upper end 57 communicating with the interior of the container 19 whereby fluid will empty through the end 57 into the container 19. The lower end portion 58 of the tube 56 extends in a horizontal plane and is positioned within the enlarged chamber 46. The tube 56 extends through the upper open end 43 of the drum 40, and the tube 56 may be supported by means of a clamp 59. Thus it will be seen that the lower end 58 of the tube 56 is open so that as the drum 40 rotates, the water containing the dirt, lint and other foreign matter from the floor will be thrown up against the inclined wall 45 of the drum 40 by centrifugal force and this water and dirt will then pass upwardly through the openings 48 into the enlarged chamber 46. As the drum 40 rotates, this fluid will enter the end 58 of the tube and then pass upwardly through the tube and empty through the outlet end 57 into the container 19. The filter 21 will remove out all of the foreign matter so that the clean water will recirculate down through the bushing 24, then through the passageway 39 and onto the floor being cleaned. The rotary sponges 51 will loosen the dirt and cause the water to be thrown by centrifugal force onto the inclined wall 45 so that this cycle is continuous. A latch 60 may be provided for maintaining the container 19 and housing 11 connected together.

From the foregoing it is apparent that there has been provided an automatic floor mop. In use the container 19 may be supplied with a suitable quantity of liquid or fluid such as soapy water and then the device is moved along the floor by means of the wheels 15, 16 and 17. The handle 14 can be used for guiding the device, and the motor 31 is connected to the electrical energy supply by means of the wire 32. As the motor 31 is actuated, the shaft 34 will rotate the pulley 35 and this in turn will cause rotation of the shaft 38 due to the provision of the endless belt 36. At the same time water from the container 19 will flow through the bushing 24 then down through the passageway 39 and onto the floor being cleaned. The drum 40 is rotated by means of the pulley 37 so that the cleaning elements 51 which may be sponges, cause the water and dirt which has been loosened on the floor to be thrown up by centrifugal force against the inclined continuous wall 45. This dirty water then passes upwardly by centrifugal force through the openings 48 and into the enlarged chamber 46. Since the tube 56 is stationary and the drum 40 is rotating, then the dirty water in the chamber 46 will be thrown up into the tube 56 and this dirty water will empty out into the container 19. The filter 21 will prevent the dirt or other foreign matter from recirculating through the bushing 24. If it is desired to stop the flow of water through the bushing 24, it is only necessary to manually pull on the cable 27 whereby the bracket 25 will coact with the stop member 26 to close off the tube or bushing 24 and prevent further flow of water therethrough. The cleaning elements 51 constantly rotate since they are connected to the plates 54 which in turn are connected to the partition 47 of the drum 40 by means of the bolts 49.

The present invention thus is directed to an automatic floor mop which will automatically apply water and soap or other cleaning material to the floor, and clean the floor and remove the dirt and water and cleaning preparation from the floor in one operation. The water to be used is carried in the container 19 and this container can be removed when it is to be filled or emptied. The lid 22 can be removed from the container so that the container can be filled or emptied and also this lid can be removed when the screen 21 is to be cleaned. The screen 21 collects lint, hair or other dirt or foreign matter that is removed from the floor and prevents this foreign matter from recirculating through the mop. The flow of water through the valve or bushing 24 can be controlled by a lever mounted on the mop handle. The water flows through the bushing 24, through the passageway 39 and then onto the floor and the bearing 41 may be of the self-lubricating type. The drum 40 is connected to the shaft 38 in any suitable manner so that as the shaft rotates the drum 40 rotates therewith. The guard 52 prevents the rotating drum from striking any objects during use. The water is picked up from the floor by the sponges 51 which are fastened to the drum and as the sponges are rotating, the centrifugal force will cause the water to flow through the sponges to the outer edge thereof and fly off the end of the sponges. Since there is a constant flow of water being picked up off of the floor and passing through the sponges 51 as they travel over the floor, the dirt is loosened and carried away with the water. As the water leaves the sponges, it strikes the lower edges of the wall 45 of the drum 40 which tapers to a larger diameter at the top. Since the centrifugal force of the water against this slanting side wall 45 is greater than the gravitational pull of the water, the water will flow up the side 45 of the drum and through the holes 48 and into the trap 46 which is formed by increasing the diameter of the drum above the partition 47 and then decreasing the diameter above that point. The water thus trapped in the chamber 46 travels with the rotation of the drum 40 around to the pipe 56 and the lower end 58 of the pipe fits closely in the trap 46 and the open end of the pipe faces in the direction of rotation of the drum. Thus, as the water is carried around by the drum the water strikes the open end 58 of the pipe 56 and the inertia of the water carries it up through the pipe 56 and back into the container 19.

The sponges 51 are connected to metal backing plates 54 which are connected to the partition 47 by the pins 49. The slots 55 in the plates 54 facilitate the removal of the sponges, and the springs 50 serve to apply pressure against the sponges 51 so that the sponges will be held on the floor and whereby there will be compensation for wear of the sponges.

When the device is being used as a floor polisher, stiff brushes of the same size are used in lieu of the sponges 51. Furthermore, soft cotton brushes can be used in place of the sponges when the mop is being used as a wax applicator. When the device is being used as a wax applicator, a different container is used to replace the container 19.

Thus, it will be seen that there has been provided an automatic mop which is simple to use and construct, and is of a small size and by changing the sponges so that the device uses brushes, there can be provided a mop, wax applicator, or floor polisher.

I claim:

1. In a cleaning implement, a horizontally disposed base, a hollow housing mounted on said base, a container for holding a quantity of fluid positioned in said housing and supported on said base, a cylindrical filter positioned in said container, a lid removably mounted on said container above said filter, there being an opening in the bottom of said container, a hollow bearing arranged in said base, a vertically disposed driven shaft rotatably supported in said bearing and provided with a bore, a resilient bushing position in the opening in the bottom of said container, a bracket arranged in engagement with said bushing, a manually operable cable connected to said bracket, a first pulley mounted on the upper end of said shaft, a motor mounted on said base and positioned in said housing, a drive shaft operated by said motor, a second pulley mounted on said drive shaft, an endless belt trained over said first and second pulleys, a hollow open drum having a truncated, conical annular wall directly joined intermediate its bottom and top by a partition connected centrally thereof and coaxially with said drum directly to said driven shaft, said partition provided with a plurality of circumferentially spaced cutouts adjacent its junction with said wall, a tube having its lower end projecting down into the top portion of said drum adjacent said cutouts and its upper end communicating with said container, the truncated end of the conical wall being its bottom, a plurality of spring pressed plates secured to said partition and arranged therebelow, a cleaning element connected to the lower surface of each of said plates, a guard secured to said base and surrounding said rotary drum, wheels positioned below said base and connected thereto, and a handle extending upwardly from said housing and secured thereto.

2. In a cleaning implement, a base, a hollow housing mounted on said base, a container for holding a quantity of fluid positioned in said housing and supported on said base, a filter positioned in said container, a lid removably mounted on said container, there being an opening in the bottom of said container, a hollow bearing arranged in said base, a driven shaft rotatably supported in said bearing and provided with a bore, a resilient bushing positioned in the opening in the bottom of said container, a bracket arranged in engagement with said bushing, a cable connected to said bracket, a first pulley mounted on said shaft, a motor mounted on said base and positioned in said housing, a drive shaft operated by said motor, a second pulley mounted on said drive shaft, an endless belt trained over said first and second pulleys, a hollow open drum having a truncated, conical annular wall directly joined intermediate its bottom and top by a partition connected centrally thereof and coaxially with said drum directly to said driven shaft, said partition provided with a plurality of circumferentially spaced cutouts adjacent its junction with said wall, a tube having its lower end projecting down into the top portion of said drum adjacent said cutouts and its upper end communicating with said container, the truncated end of the conical wall being its bottom, a plurality of spring pressed plates secured to said partition and arranged therebelow, a cleaning element connected to each of said plates, a guard secured to said base and surrounding said rotary drum, wheels positioned below said base and connected thereto, and a handle extending upwardly from said housing and secured thereto.

*3. In an automatic floor cleaning implement, a generally horizontal base, a hollow housing mounted on said base, a motor on said base positioned in said housing, a drive member, support means on said base rotatably supporting said member to be rotatable about a vertical axis, means connecting said drive member with said motor, said drive member to be rotated upon energization of said motor, a fluid duct extending centrally through said support means, a container for holding a quantity of fluid, conduit means connecting said container and said duct to supply fluid to said duct, valves means for regulating the flow of fluid from said container downwardly through said duct, a hollow open drum having a truncated conical annular wall with the truncated end of said wall being at the lower end thereof, a mounting partition for said drum connected to said wall intermediate the upper and lower ends of said wall, said wall converging inwardly above said partition to provide an inwardly facing open chamber, said partition having means securing it in rotatable driving engagement with said drive member including a central bore in said partition through which fluid is supplied from said duct to the underside of said partition, a plurality of circumferentially spaced cutouts in said partition adjacent the connection of said partition with said wall, a plurality of cleaning elements secured on the underside of said partition, and a tube having its lower end projecting into said inwardly facing chamber adjacent said cutouts and its upper end communicating with said container.*

*4. In an automatic floor cleaning implement, a generally horizontal base, a motor on said base, a drive member, support means on said base rotatably supporting said member to be rotatable about a vertical axis, means connecting said drive member with said motor, said drive member to be rotated upon energization of said motor, a fluid duct extending centrally through said support means, a container for holding a quantity of fluid, conduit means connecting said container and said duct to supply fluid to said duct, valve means for regulating the flow of fluid from said container downwardly through said duct, a hollow open drum having a truncated conical annular wall with the truncated end of said wall being at the lower end thereof, a mounting partition for said drum connected to said wall intermediate the upper and lower ends of said wall, said wall converging inwardly above said partition to provide an inwardly facing open chamber, said partition having means securing it in rotatable driving engagement with said drive member including a central bore in said partition through which fluid is supplied from said duct to the underside of said partition, a plurality of circumferentially spaced cutouts in said partition adjacent the connection of said partition with said wall, a plurality of cleaning elements secured on the underside of said partition, and a tube having its lower end projecting into said inwardly facing chamber adjacent said cutouts and its upper end communicating with said container.*

*5. In an automatic floor cleaning implement, a generally horizontal base, a motor on said base, a drive member, support means on said base rotatably supporting said member to rotate about a vertical axis, means connecting said drive member with said motor, said drive member to be rotated upon energization of said motor, a fluid duct extending centrally through said support means, a container for holding a quantity of fluid, conduit means connecting said container and said duct to supply fluid to said duct, valve means for regulating the flow of fluid from said container downwardly through said duct, a hollow open drum having a truncated conical annular wall with the truncated end of said wall being at the lower end thereof, a mounting partition for said drum connected to said wall to extend transversely of said drum, said wall converging inwardly adjacent its upper end to provide an inwardly facing open chamber, said partition having means securing it in rotatable engagement with said drive member including a central bore in said partition through which fluid is supplied from said duct to the underside of said partition, a plurality of cleaning elements mounted beneath said partition to be rotatable with said partition and said drum, and a tube having its lower end projecting into said inwardly facing chamber and its upper end communicating with said container.*

*6. In an automatic floor cleaning implement, a mopping assembly comprising in combination a hollow open drum to be rotated in a generally horizontal plane and having a truncated conical annular wall with the truncated end of said wall being at the lower end thereof, a mounting partition for said drum connected to said wall intermediate the upper and lower ends of said wall, said wall converging inwardly above said partition to provide an inwardly facing fluid-retaining open chamber, a plurality of circumferentially spaced cutouts in said partition adjacent the connection of said partition with said wall, said partition having means for mounting said assembly in rotatable driving engagement with the drive member of the cleaning machine, said means including a central bore in said partition through which fluid is supplied to the underside of said partition, and a plurality of cleaning elements secured on the underside of said partition.*

*7. In an automatic floor cleaning implement, a generally horizontal base, a motor on said base, a drive member, support means on said base rotatably supporting said member to be rotatable about a vertical axis, means connecting said drive member with said motor, said drive*

*member to be rotated upon energization of said motor, a fluid duct extending centrally through said support means, a container for holding a quantity of fluid, conduit means connecting said container and said duct to supply fluid to said duct, valve means for regulating the flow of fluid from said container downwardly through said duct, a hollow open drum having a truncated conical annular wall with the truncated end of said wall being at the lower end thereof, a mounting partition for said drum connected to said wall intermediate the upper and lower ends of said wall, said wall converging inwardly above said partition to provide an inwardly facing open chamber, said partition having means securing it in rotatable driving engagement with said drive member including a central bore in said partition through which fluid is supplied from said duct to the underside of said partition, a plurality of circumferentially spaced cutouts in said partition adjacent the connection of said partition with said wall, a plurality of cleaning elements secured on the underside of said partition, said elements being disposed to extend generally radially relative to the rotation axis of said drum and partition, and a tube having its lower end projecting into said inwardly facing chamber adjacent said cutouts and its upper end communicating with said container.*

*8. In an automatic floor cleaning implement, a mopping assembly comprising in combination a hollow open drum to be rotated in a generally horizontal plane and having a truncated conical annular wall with the truncated end of said wall being at the lower end thereof, a mounting partition for said drum connected to said wall intermediate the upper and lower ends of said wall, said wall converging inwardly above said partition to provide an inwardly facing fluid-retaining open chamber, a plurality of circumferentially spaced cutouts in said partition adjacent the connection of said partition with said wall, said partition having means for mounting said assembly in rotatable driving engagement with the drive member of the cleaning machine, said means including a central bore in said partition through which fluid is supplied to the underside of said partition, and a plurality of cleaning elements secured on the underside of said partition, said elements being disposed to extend generally radially relative to the rotation of said assembly.*

References Cited in the file of this patent or the original patent

UNITED STATES PATENTS

| | | |
|---|---|---|
| 695,479 | Nelson | Mar. 18, 1902 |
| 2,242,577 | Finnell | May 20, 1941 |
| 2,518,183 | Renne | Aug. 8, 1950 |
| 2,667,652 | Engel | Feb. 2, 1954 |
| 2,677,142 | Mundo | May 4, 1954 |
| 2,680,260 | Danielsson | June 8, 1954 |

FOREIGN PATENTS

| | | |
|---|---|---|
| 673,183 | Great Britain | June 4, 1952 |